(12) United States Patent
Crist et al.

(10) Patent No.: US 9,163,978 B2
(45) Date of Patent: Oct. 20, 2015

(54) PURGE-BIN WEIGHING SCALE

(71) Applicant: Bank of America Corporation, Charlotte, NC (US)

(72) Inventors: Kristy M. Crist, Charlotte, NC (US); Terrelle Carswell, Charlotte, NC (US); Eric McConnell, Cornelius, NC (US); Rahul Puri, Charlotte, NC (US); Devin D. Rhodes, Lexington, KY (US); James D. Goodwin, Kansas City, MO (US)

(73) Assignee: Bank of America Corporation, Charlotte, NC (US)

( * ) Notice: Subject to any disclaimer, the term of this patent is extended or adjusted under 35 U.S.C. 154(b) by 234 days.

(21) Appl. No.: 13/897,534

(22) Filed: May 20, 2013

(65) Prior Publication Data

US 2014/0338986 A1      Nov. 20, 2014

(51) Int. Cl.
*G07F 19/00* (2006.01)
*G01G 19/42* (2006.01)
*G07D 13/00* (2006.01)
*G01G 19/414* (2006.01)
*G06Q 20/10* (2012.01)
*G06M 9/00* (2006.01)

(52) U.S. Cl.
CPC .............. *G01G 19/42* (2013.01); *G01G 19/414* (2013.01); *G07D 13/00* (2013.01); *G07F 19/202* (2013.01); *G06M 9/00* (2013.01); *G06Q 20/1085* (2013.01)

(58) Field of Classification Search
CPC . G01G 19/42; G01G 19/414; G07D 11/0084; G07D 11/0096; G07D 13/00; G06M 9/00; G06Q 20/108; G06Q 20/1085; G07F 19/202; G07F 19/203
See application file for complete search history.

(56) References Cited

U.S. PATENT DOCUMENTS

| 4,447,885 | A | * | 5/1984 | Biss | 702/129 |
| 4,512,428 | A | * | 4/1985 | Bullivant | 177/25.17 |
| 4,646,767 | A | * | 3/1987 | Hikita | 453/58 |
| 4,674,060 | A | * | 6/1987 | Larkin et al. | 702/129 |
| 5,193,629 | A | * | 3/1993 | Lare | 177/25.17 |
| 5,723,825 | A | * | 3/1998 | Dolan et al. | 177/145 |
| 5,944,162 | A | * | 8/1999 | Filiberti | 194/204 |

(Continued)

FOREIGN PATENT DOCUMENTS

EP        1843303        10/2007

OTHER PUBLICATIONS

"Diebold Opteva Divert/ Retract ATM Cassette—Tamper-Indicating," DieboldDirect.com, Feb. 17, 2013.

(Continued)

*Primary Examiner* — Randy W Gibson
(74) *Attorney, Agent, or Firm* — Weiss & Arons LLP; Michael A. Springs, Esq.

(57) ABSTRACT

Apparatus and methods for a self-service device ("SSD") purge-bin weighing scale are provided. The SSD may include a dispenser. The dispenser may disburse one or more tangible items to a customer. The dispenser may retract at least one of the tangible items disbursed to the customer. The SSD may include a purge-bin. The purge-bin may hold at least one tangible item. The purge-bin may hold the tangible item after the tangible item is retracted by the dispenser. The SSD may include a scale. The scale may measure a weight. The weight may be the weight of at least one tangible item. The scale may measure the weight after the tangible item is retracted by the dispenser. The scale may measure the weight of the tangible item prior to a transfer of the tangible item to the purge-bin.

19 Claims, 6 Drawing Sheets

(56) References Cited

U.S. PATENT DOCUMENTS

| | | | |
|---|---|---|---|
| 5,945,602 A | 8/1999 | Ross | |
| 5,954,576 A * | 9/1999 | Coulter et al. | 453/17 |
| 6,073,837 A | 6/2000 | Milne | |
| 7,347,359 B2 | 3/2008 | Boyes et al. | |
| 7,638,746 B2 | 12/2009 | Jespersen | |
| 7,856,401 B2 | 12/2010 | Ross et al. | |
| 8,283,580 B2 * | 10/2012 | McPhail et al. | 177/25.17 |
| 2009/0192938 A1 * | 7/2009 | Amos | 705/43 |

OTHER PUBLICATIONS

"Bank ATMs stop sucking in cash after RBI direction," EconomicTimes.com, Sep. 23, 2012.

* cited by examiner

PURGE-BIN WEIGHING SCALE

FIELD OF TECHNOLOGY

Aspects of the invention relate to reducing costs associated with automated teller machine ("ATM") mis-dispense claims.

BACKGROUND

ATMs provide banking customers an ability to access bank account information, deposit funds and withdraw cash. ATMs may often obviate the need for a banking customer to consult a human clerk. Additionally, ATMs may be located in a variety of diverse locations remote from banking centers. For example, ATMs may be placed on street corners, in convenience stores, supermarkets or sports arenas.

In a typical ATM transaction, the customer may submit a request for a withdrawal of an amount of cash. The ATM may determine whether the customer has a bank account balance corresponding to, at least, a value of the requested funds. If the customer has sufficient bank account balance, the ATM may dispense the requested amount of cash.

The ATM may present the requested amount of cash to the customer. If the customer does not collect all of the dispensed cash, the ATM may be configured to retract uncollected cash. The ATM may be configured to wait for an expiration of a "time out" period before retracting cash.

An ATM customer may not retrieve all, or a portion of, dispensed cash as a result of an ATM malfunction. For example, the customer may submit a request for $80.00 in twenty-dollar notes and the ATM may erroneously dispense $40.00 in ten-dollar notes. As a further example, the ATM may not provide sufficient time for the customer to become aware that the cash has been dispensed. The ATM may retract cash before the customer has time to collect dispensed cash.

In response to a retraction of cash by the ATM, a customer may submit a mis-dispense claim. The customer may submit the mis-dispense claim to an operator of the ATM. The customer may submit the mis-dispense claim to an entity responsible for managing a bank account of the customer.

The customer may request a credit for uncollected cash retracted by the ATM. The customer may request that because cash was retracted by the ATM, the account of the customer should not be debited. The customer may allege that none or a portion of a requested amount of cash was collected by the customer.

A wide variety of ATM locations and lack of close supervision at an ATM increase a risk that a customer may submit an unwarranted mis-dispense claim. For example, the customer may intentionally collect only a portion of dispensed cash. The customer may then submit a mis-dispense claim alleging not to have collected any of the dispensed cash. Unwarranted mis-dispense claims have become so prevalent that some ATM operators have disabled a cash retraction feature of ATMs.

It would be desirable to provide a solution that determines an amount of cash retracted by an ATM following an unsuccessful customer withdrawal. The amount of cash retracted by the ATM may be associated with a transaction or series of transactions. The amount of cash may be associated with a customer or customer account. The retracted cash may be examined. Examination of the retracted cash may provide information useful in a processing of mis-dispense claims and fraud research.

Additionally, a requirement to replenish a cash supply of the ATM is a cost of operating an ATM or a network of ATMs. Typically, ATMs may be refilled in any interval between bi-weekly to a per day basis. Some ATMs in busy locations must be refilled twice a day. ATM operators may be reluctant to stock ATMs with additional cash because until the cash is dispensed from the ATM, the cash is idling, increasing an opportunity cost of the cash. Restricting the amount of cash that may be withdrawn by a customer may inconvenience and irritate the customer. Armored personnel and services are typically employed to deliver cash to an ATM, further increasing the cost of replenishing the cash supply of an ATM.

An examination of cash dispensed or retracted by an ATM may indicate that a cash inventory of the ATM is not being efficiently utilized. Obtaining accurate information relating to cash dispensing or retracting may allow an ATM operator to better manage a cash inventory of an ATM or network of ATMs.

For example, an ability to examine cash prior to dispensing the cash may verify that genuine notes of the correct denomination are being dispensed from the ATM. The examination may reduce a cost of dispensing counterfeit notes, non-currency items or incorrect denominations that may have been erroneously loaded into the ATM. Detection of an erroneous loading of cash into the ATM may identify a human error or a process breakdown related to cash inventory.

Therefore, it would be desirable to obtain detail associated with cash dispensed or retracted from an ATM. It would be desirable to obtain a transaction detail associated with cash dispensed or retracted from an ATM. The transaction detail may supply information used in managing cash supplied to an ATM.

Therefore, it would be desirable to provide apparatus and methods for a purge-bin weighing scale.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
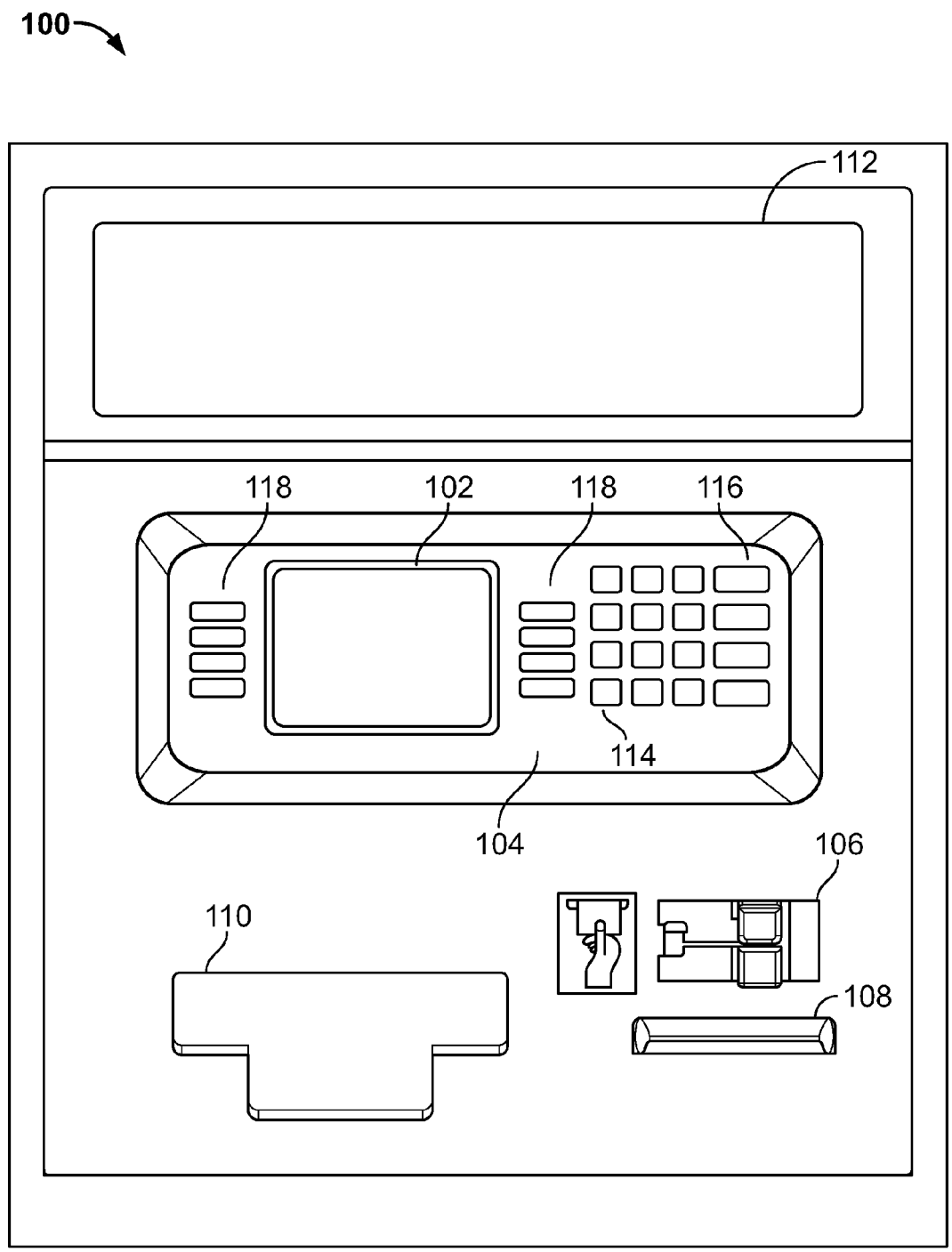
FIG. 1 shows an illustrative apparatus in accordance with principles of the invention.

Apparatus and methods for a self-service device ("SSD") are provided. The SSD may be a kiosk, a terminal, an automated teller machine ("ATM") or any suitable SSD. The SSD may be located within a bank branch. The SSD may be a stand-alone SSD. The SSD may be part of a network of SSDs.

The SSD may include a dispenser. The dispenser may be configured to dispense one or more items. The item may be a tangible item. The item may be an item of monetary value. The item may be a bank note, U.S. Treasury note, check, cash or any other suitable financial instrument. The item may be a ticket. The ticket may be an event ticket or a transportation ticket. The item may be a receipt.

An item dispensed by the SSD may be presented to a customer. The customer may retrieve the item from the dispenser. The dispenser may be configured to retract one or more items. The retracted item may be one of a plurality of items dispensed to the customer. For example, three bills may be dispensed to a customer. The customer may collect two of the three bills. After a period of time, the one uncollected bill may be retracted by the SSD.

The dispenser may be configured to receive an item from a customer. For example, the customer may deposit a check or a bill into the dispenser. The dispenser may retract the deposit into the SSD.

The SSD may include a purge-bin. The SSD may include a feeder network for transferring an item from the dispenser to the purge-bin. The feeder network may include rollers, belts, tracks, picks, motors, magnets, suction pads or any other suitable components. The purge-bin may receive one or more items retracted by the dispenser. The purge-bin may be configured to store one or more of the retracted items. The item may be stored in the purge-bin until the SSD is serviced. For example, a bill may be retracted by the dispenser. The dispenser may transfer the bill to the purge-bin via the feeder network. The bill may be stored in the purge-bin until the ATM is restocked.

The SSD may include a sensor. The sensor may be camera, an optical device or any suitable sensor. The sensor may examine the bill. The camera may photograph the bill. The photograph may be stored in computer-readable memory. The photograph may be transmitted to an off-site server or database.

The sensor may be a scale. The scale may weigh an item retracted by the dispenser. The scale may weigh an item deposited at the SSD. The scale may be located along a feeder network connecting the dispenser to the purge-bin.

The dispenser may retract a bill uncollected by a customer. The bill may be transferred from the dispenser to the scale. The bill may be transferred via the feeder network. The feeder network may transfer the bill from the scale to the purge-bin.

The purge-bin may include a scale. The purge-bin may include a floor. The floor may support one or more tangible items stored in the purge-bin. The floor of the purge-bin may include the scale. The floor may be supported by one or more struts. The struts may include the scale. The scale may measure a weight of an item stored in the purge-bin. The scale may be removable from the purge-bin. For example, the scale may sit on top of the purge-bin floor. The scale may be detachable from the purge-bin floor.

A scale may measure a weight of an item. The scale may measure a plurality of weights for an item. The scale may measure a weight of a bill retracted by the dispenser. The scale may determine if the weight of the retracted bill is within a threshold associated with an item. For example, a threshold associated with the item may be stored in a database associated with a SSD. The threshold may correspond to a weight. The threshold may correspond to a range of weights. The range may include an upper limit. The range may include a lower limit.

For example, a threshold associated with a U.S. Treasury Note may include a lower limit of 0.9 grams and an upper limit of 1.1 grams. A deposited note that weighs less than 0.9 grams or more than 1.1 grams may be designated as an unacceptable note. The unacceptable note may be returned to a customer via the dispenser. The unacceptable note may be retained by the SSD. The unacceptable note may be removed from circulation. The unacceptable note may be stored in a section of the purge-bin. The unacceptable note may be stored separately from other notes in the purge-bin.

The unacceptable note may be inspected. The inspection may be performed by a human. The inspection may be performed by an optical device, scanner or camera. The inspection may be performed in real time. The inspection may be initiated immediately after a bill is determined to be an unacceptable bill. The inspection may confirm that the note is unacceptable. For example, the inspection may determine that the note is soiled and cannot be cleaned. The inspection may determine that the note is counterfeit.

The scale may measure a weight of a stack of bills. The scale may measure a plurality of weights for a stack of bills. The stack may be measured before being dispensed to a customer. For example, a customer may input a request for $200 into an SSD. The SSD may transmit the request to a cash cassette. The cash cassette may transfer $200 worth of bills. The bills may be ten $20 bills. The bills may be transferred to a scale. The bills may be transferred to the scale via the feeder network. The scale may weigh the stack of bills. The scale may weigh each bill individually. The scale may transmit the weight to a processor. The processor may determine if the weight of each bill is within a threshold range limit.

For example, a threshold range for an acceptable bill may include a minimum weight of 0.9 grams and a maximum weight of 1.1 grams. A single bill weighing less than 0.9 grams may be classified as unacceptable. A single bill weighing greater than 1.1 grams may be classified as unacceptable. The unacceptable bill may be transferred to the purge-bin. The unacceptable bill may be replaced with a replacement bill. The replacement bill may be retrieved from a cash cassette. If the processer determines that each bill is within the threshold weight range, the bills may be transferred to the dispenser.

The feeder network may transfer the stack of bills to an optical scanner. For example, the scale may determine that bills in the stack are each within a threshold weight. The optical scanner may scan each bill. The scan may determine if a bill is soiled, counterfeit, inadequate or torn. The scan may determine if a bill is a valid monetary note. For example, the scan may determine that a bill may be a blank piece of paper. The scan may classify the bill as soiled, counterfeit, inadequate, ripped or otherwise unacceptable. The scanner may transmit a message to replace the bill. The SSD may replace the bill with a proper bill. The proper bill may be retrieved from a cash cassette.

The scale may measure two or more weights. The scale may measure a first total weight. For example, the scale may measure a weight of a stack of notes. The stack may be weighed after removal from a cash cassette, and prior to a transfer of the stack to the dispenser. The scale may measure a second total weight. For example, the customer may not collect each bill included in the stack of notes. The dispenser may retract the uncollected notes. The scale may measure the weight of the uncollected notes. The weight of the uncollected notes may be the second total weight.

As a further example, a customer may input a request into an SSD for five $20 bills. The SSD may retrieve a stack of five $20 bills. The stack of bills may be transferred to the scale. The scale may determine a first weight for the stack of bills. The weight may be stored in a database associated with the SSD. The weight may be within a threshold weight range of five bank notes. The threshold weight range may correspond to an average total weight range of five $20 bills. A predetermined weight associated with a bank note may be retrieved from a database associated with the SSD. If the weight is within the threshold, the SSD may dispense the stack.

A feeder network may transfer the stack of five $20 bills to the dispenser. The dispenser may present five $20 bills to the customer. The customer may collect three of the $20 bills. After a period of time, the SSD may retract the two uncollected $20 bills. The feeder network may transfer the retracted two uncollected $20 bills to the scale. The scale may determine the weight of the retracted bills. Based on the weight of the retracted bills, a computer system may be used to determine the number of bills retracted.

A weight measured by the scale may be associated with weight measurement information. The weight measurement information may include a time, date, transaction number, transaction identifier, location, session identifier, ATM identifier, customer account number or any suitable information. Weight measurement information may be stored in computer-readable memory, a processor, a CPU inside the SSD, external financial institution servers or databases, or any other suitable component.

Weight measurement information may be transmitted to a financial institution. The weight measurement information may be transmitted to the financial institution in real-time. For example, the scale may weigh bank notes retracted by the SSD. The weight of the bank notes may be stored in a database associated with the SSD. The weight may be transmitted to a financial institution. The financial institution may transmit information associated with the weight to a customer.

For example, the financial institution may receive a claim from a customer. The claim may dispute an amount of funds received by the customer. The customer may claim that an account was debited $100. Yet, the customer may only receive $40 from a SSD. The financial institution may transmit the weight information to the customer. The information may be transmitted to the customer as evidence. The information may be transmitted to a fraud detection unit of the financial institution. The evidence may be used by the financial institution to rebut the claim.

The weight may be the weight of the bills collected by the customer. The weight of the bills collected by the customer may be determined by obtaining the difference between the weight of the bills before dispensing and the weight of the uncollected bills retracted by the SSD. The weight of the bills collected by the customer may be associated with additional identifying transaction information.

The scale may be calibrated. The SSD may calibrate the scale. A remote system may calibrate the scale. The calibration may account for any items presently on the scale or within the purge-bin. For example, the purge-bin may include a scale integrated into a floor of the purge-bin. The purge-bin may store a first stack of bills. Prior to receipt of a second stack of bills, the scale may be calibrated to reduce the risk of error from the first stack of bills already being present in the purge-bin. The scale may be calibrated by using a zero-out method. The zeroing-out of the scale may reduce computational overhead. For example, prior to the determination of a new weight, all prior weight is set to zero. This may allow for only a weight of one item to be precisely obtained despite a presence of additional items on the scale or in the purge-bin.

The SSD may include a processor. The processor may be operably connected to the scale, dispenser, database, server purge-bin and any other internal or external components of the SSD. The processor may analyze the weight of the note determined by the scale. For example, the scale may obtain the weight of a note. The scale may transmit the weight to the processor. The processor may determine whether the weight is within a threshold weight.

The threshold weight may be a threshold weight associated with a single U.S. Treasury Note. The threshold weight may be a weight associated with a plurality of notes. The threshold weight may be a weight range. The threshold weight of a U.S. Treasury Note may be one gram (1 gr.).

For example, a bank note may be associated with a maximum threshold weight of 1.3 grams. The maximum threshold weight may be stored in a SSD. The SSD may include a scale. The scale may determine the weight of a bank note. The weight of the note may be 1.2 grams. A processor may determine if the weight of the note exceeds the maximum threshold weight associated with the note. The processor may determine that the 1.2 gram weight of the note does not exceed the maximum threshold weight of 1.3 grams. A note that does not exceed the maximum threshold weight may be treated as an acceptable bank note. The processor may determine that the note is an acceptable note. The processor may instruct the scale to transfer the acceptable note to the depository. The processor may instruct the scale to transfer the acceptable note to the purge-bin.

The processor may determine that the weight of one or more notes is greater than the maximum threshold weight. The processor may determine that the weight of the notes falls within a second threshold range associated with the note. The second threshold range may be a weight range. The weight range may include an upper limit and a lower limit. For example, a first threshold weight range for a note may be 0.9-1.1 grams. The processor may categorize a note weighing between 0.9-1.1 grams as an acceptable note. The first maximum threshold weight for a note may be 1.1 grams. A second threshold weight range for a note may be 1.1-1.3 grams. The second maximum threshold weight may be 1.3 grams. The processor may categorize a note weighing between 1.1-1.3 grams as a possible unacceptable note. The processor may categorize a note weighing more than 1.3 grams as an unacceptable note.

The second threshold maximum weight may be determined based on a total number of bills initially dispensed to a customer. For example, a customer may input a request into an SSD for $100. The $100 may be dispensed as five $20 bills. The first maximum threshold weight of a single bill may be stored in a database associated with the SSD. The maximum weight associated with the first maximum threshold weight may be stored as a maximum weight of 1.2 grams per bill. The second maximum threshold weight of a single bill may be stored in a database associated with the SSD. The maximum weight associated with the second maximum threshold weight may be 1.5 grams per bill. The maximum weight for a stack of bills may be determined by obtaining the product of the number of bills initially dispensed (i.e. 5 bills) and the second maximum threshold weight for a single bill (i.e. 1.5 grams). The second maximum threshold weight of five bills may be 7.5 grams (i.e. 5 bills×1.5 grams).

The SSD may determine the weight of the retracted bills. The weight of the retracted bills may be determined as a stack. For example, the SSD may weigh a stack of retracted bills together. The SSD may determine if the weight of the stack of bills exceeds the second maximum threshold weight. If the weight of the entire stack exceeds the second maximum threshold weight, the SSD may categorize the bills as unacceptable. The SSD may place the unacceptable the bills in the purge-bin. The stack may be inspected The weight of a stack of bills may be determined based on weighing each individual bill in the stack. For example, seven bills may be dispensed to a customer. The customer may collect two of the bills. After a period of time, the five uncollected bills may be retracted by the SSD. The SSD may transfer the five bills to the scale. The scale may weigh each of the five uncollected bills individually. The processor may determine if a weight of each of the five uncollected bills exceeds the first maximum threshold weight.

The processor may determine the number of bills in a stack based on the weight of the stack. For example, a stack that weighs 9.0 grams may be associated with nine bills. Each individual bill may be associated with an individual weight. A weight of 1.0 grams may be associated with a single bill. The processor may round the weight of the bills to the nearest whole number. The weight of a bill or stack may be rounded to determine the precise number of bills associated with the weight. For example, a total weight of 9.4 grams may be rounded to 9.0 grams. The processor may determine that 9.0 grams corresponds to nine bills. In another example, a total weight of 11.6 grams may be rounded to 12.0 grams. The processor may round the weight of the bills to a whole number. For example, a weight of 7.2 grams may be rounded up to 8.0 grams. The 8.0 grams may correspond to eight bills.

The SSD may assign a minimum threshold weight. The minimum threshold weight may be a minimum weight for an individual bank note. The SSD may store the monetary value of the minimum threshold weight in a database associated with the SSD. For example, the minimum threshold weight assigned to an individual bill may be 0.8 grams. The scale may determine the weight of the bank note. The processor may determine if the weight of the bank note is less than the minimum threshold weight.

For example, a minimum threshold weight for a bank note may be 0.75 grams. If a weight of a retracted or deposited note is 0.7 grams, the processor may categorize the note as an unacceptable note. A transaction may be categorized as an unacceptable transaction if there is an unacceptable note in the transaction. A transaction may be flagged for further review, or flagged as requiring inspection, if an unacceptable note is involved in the transaction. The flag may be any suitable flag. For example, a physical tag, tab, divider, notation on the activity record or any suitable identifier may be used as a flag. In a further example, the flag may be an electronic flag stored in a database and associated with the details of the transaction. The further review may be performed by a human. An unacceptable transaction may cause the SSD to generate an activity record.

The processor may determine a numerical difference between two or more weights. The difference may correspond to a weight measurement. For example, a difference between a weight of 2.0 grams and 1.0 gram may be 1.0 gram. The difference may correspond to a monetary value. The difference may be the difference between a first total weight and a second total weight.

For example, a scale may determine a first total weight of a stack of bills prior to dispensing the bills. The first total weight may be 9.5 grams. The scale may determine a second total weight of the stack of bills after retracting at least a portion of the bills. The second total weight may be 7.1 grams. The processor may determine the difference between the first weight and the second weight. The difference between the first total and the second total weight may be 2.4 grams.

The processor may assign a monetary value to the difference between the first total weight and the second total weight. For example, the SSD may dispense $20 denomination bills. The processor may assign a monetary value of $20 for each 1.0 gram of weight. The processor may round the weight of the bills to the nearest whole number. A weight of 2.4 grams may be rounded down to 2.0 grams. A weight of 2.0 grams may be assigned a monetary value of $40. The $40 monetary value may correspond to a monetary value of the bills dispensed to the customer. The processor may round up the weight of the bills. For example, a weight of 2.4 grams may be rounded up to 3.0 grams. The processor may assign a monetary value of $60 to a weight of 2.4 grams. The $60 monetary value may be the monetary value of the bills dispensed to the customer.

The processor may determine the monetary value of bills uncollected by a customer. For example, a scale may determine a first total weight of a stack of six bills. The total monetary value of the stack may be $120. The total weight may be 6.5 grams. The feeder network may transfer the bills to the dispenser. The dispenser may dispense the six bills. The customer may collect three of the six bills. The dispenser may retract the three uncollected bills. The feeder network may transfer the three uncollected bills to the scale. The scale may determine the weight of the three uncollected bills.

The uncollected bills may have a total weight of 3.2 grams. The processor may assign a monetary value of $60 to the three uncollected bills. The processor may assign a monetary value of $60 to the three collected bills. The monetary value may be assigned based on rounding the total weight of 3.2 grams to 3.0 grams. The customer account may be debited for $60. If the customer account was debited for $120, a $60 credit may be issued.

Apparatus and methods for detecting an amount of currency retracted by a SSD are provided. The apparatus and methods may be performed using any suitable financial or banking device or system.

The SSD may include a dispenser. The dispenser may present currency to a SSD customer. The dispenser may retract currency. The retracted currency may be a portion of the retracted currency. The retracted currency may be currency dispensed to a customer that was not collected by the customer.

The currency may be retracted by the dispenser after expiration of a time period. The time period may correspond to a time-out ("TO"). The time-out may be a time delay between the dispensing of the currency and retraction of the uncollected currency. For example, a time delay may be set for a transaction. A time delay of twenty seconds may be assigned for each transaction. The dispenser may present currency to a customer. After twenty seconds have elapsed, the dispenser may retract the uncollected currency. The customer may collect all of the currency dispensed. The dispenser may not retract any currency.

The SSD may include a scale. The scale may determine a weight. The scale may determine the weight of a stack of bills. The scale may measure a weight of a portion of the dispensed currency. The scale may measure a weight of one bill from a stack of bills. The scale may weigh a bill after retrieving the bill from a cash cassette. The scale may weigh a bill before transferring the bill to the dispenser. The scale may weigh uncollected bills after the bills are retracted by the dispenser. The scale may be located along a feeder network. The scale may weigh the bill at any point along the feeder network.

The scale may transmit weight measurements to external components, servers or databases. For example, the SSD may transmit weight information of a stack of bills to an offsite data center of a financial institution. The financial institution may retrieve the weight at a later time. For example, a customer may dispute the transaction three months after the transaction date. The financial institution may retrieve the weight information at a time the transaction is disputed. The financial institution may analyze the weight and associated data in real-time. For example, the financial institution may monitor the events of the transaction as they occur.

The SSD may include a processor. The processor may calculate a monetary value. The monetary value may correspond to a portion of the currency. For example, a monetary value of $20 may be assigned to each increment of 1.0 gram. The value may be calculated based on the weight of the currency. For example, a monetary value of $80 may be assigned to a 4.0 gram weight of currency.

A first monetary value may be assigned when the currency has a first weight. For example, the weight of a stack of bills may be determined to be four grams prior to dispensing. The weight of four grams may be assigned a first monetary value of $80.

A second monetary value may be assigned when the currency has a second weight. For example, the weight of a stack of bills may be determined to be one gram after retraction. The weight of one gram may be assigned a second monetary value of $20.

The SSD may associate the monetary value with an identifier. The identifier may be a transaction identifier. For example, a withdrawal of $40 may be associated with a transaction identifier. In a further example, the transaction identifier may be assigned a numeric code, such as number 345766. The identifier may be a session identifier. The session identifier may be number 4658A9. The transaction identifier may be an alpha-numeric identifier. The alpha-numeric identifier may be randomly assigned. The alpha-numeric code may be consecutively assigned.

For example, each transaction associated with a customer account may be assigned an alpha-numeric identifier that is increased consecutively from the previous transaction. In another example, a customer may perform a first transaction in the morning. The transaction may be assigned an identifier of 5324. The customer may perform a second transaction in the afternoon. The transaction may be assigned an identifier of 5325. Each transaction at a SSD may be assigned an alpha-numeric identifier that is increased consecutively from the previous transaction. For example, a first customer may withdraw cash from an SSD. The transaction may be assigned an identifier of 643A7. A second customer may deposit a check at the SSD. The transaction may be assigned an identifier of 643A8.

The transaction identifier may be associated with the session identifier. For example, the $40 withdrawal associated with transaction identifier 345766 may occur during an ATM session. Transaction identifier 345766 may be associated with session identifier 4658A9. Multiple transaction identifiers may be associated with a single session identifier. For example, a customer may initiate a session at a SSD. The customer may withdraw cash during the session. The customer may check an account balance during the session. The session may be assigned session identifier 276. The withdrawal transaction may be assigned transaction identifier 3475. The balance check transaction may be assigned transaction identifier 3476. The withdrawal and the balance check may each be associated with session ID 276.

The identifier may be associated with other information. The identifier may be associated with a specific SSD identifier, branch, customer account number, date, time, geographic tag or location, transaction amount, account record or any suitable information.

An account record may include any suitable information associated with a transaction. For example, the account record may include a location of the transaction, a transaction amount and a transaction time. The account record may be associated with a transaction identifier. The account record may include information associated with a session. The account record may include the number of transactions performed in a session, the types of transactions, monetary values of the transactions, location, date, time and account number.

For example, a customer may initiate a session at an SSD. The session may include one or more transactions. In a first transaction, the customer may deposit a check. In a second session, the customer may transfer funds between two accounts. An account record may be associated with the session. The account record may include information related to the first transaction and the second transaction. The account record may be associated with a session identifier.

The account record may include a first weight. For example, a stack of bills may be retrieved from a cash cassette. The stack of bills may be transferred to the scale. The scale may weigh the stack of bills. The stack of bills may be transferred to the dispenser. The dispenser may dispense the stack of bills to a customer.

The record may include a second weight. For example, the dispenser may retract the uncollected bills. The uncollected bills may be transferred to the scale. The scale may weigh the uncollected bills. The weight of the uncollected bills may be the second weight. The record may include a date associated with the transaction. The date may be the date of the transaction occurrence. The record may include a time associated with the transaction. The time may be the time of the transaction occurrence.

The record may include a first monetary value corresponding to currency requested by a customer. For example, the customer may submit a request to a SSD for $200. The first monetary value may be $200.

The record may include a second monetary value corresponding to currency collected by the customer. For example, the customer may collect $100 of $200 dispensed. The monetary value of currency collected by the customer may be obtained by determining the difference between the value of the bills dispensed to the customer and the value of the bills retracted by the SSD. The record may include a third monetary value corresponding to the currency retracted by the SSD. For example, the SSD may retract $60. The record may include a fourth monetary value. The fourth monetary value may correspond to a difference between funds requested by the customer and funds received by the customer. For example, the customer may request $200. The SSD may dispense $200. The customer may collect $160. The SSD may retract $40 uncollected by the SSD. The difference between the funds requested by the customer and the funds received by the customer may be $40.

The transaction identifier and session identifier may be stored in a database associated with a financial institution. The account record may be stored in a database associated with a financial institution. The identifier may be indexed to the account record. For example, a customer may initiate a dispute with a financial institution. The customer may provide a transaction identifier. The transaction identifier may be printed on a receipt that was collected by the customer. The transaction identifier may be used to access details of the disputed transaction. The customer may provide a detail from the account record. For example, the customer may provide a date of the transaction. The detail may be used by the financial institution to access the account record. The detail may be used by the financial institution to access information included in the account record.

The SSD may associate the monetary value of the retracted currency with the transaction identifier when the weight measurement of the currency occurs within a time period. The time period may be stored in a database associated with the SSD. For example, two bills may be retracted by the dispenser. The SSD may determine whether the two bills are associated with a specific transaction. The SSD may determine if the most recent prior transaction occurred within a threshold time period. For example, a threshold time period may be set at twenty seconds. The SSD may determine whether the weighing of the two retracted bills occurred within twenty seconds of a retraction. If the weighing of the two bills occurred within twenty seconds of a retraction, the retraction may be assigned a monetary value of $40. The retraction may be associated with the time of the retraction. The time period may result in a time out. The time-out may be determined based on the time of $T_{threshold}+TO$.

The SSD may compare the weight of the currency to a threshold weight. The weight of the currency may be compared to the threshold prior to dispensing the currency. The comparing to the threshold weight may indicate that an unacceptable note is present. The currency may be transferred from the cash cassette to the scale. The scale may weigh the currency. The feeder network may transfer the currency to the dispenser.

The threshold weight may be the weight of a U.S. Treasury Note. The threshold weight of the U.S. Treasury note may be stored in a database associated with the SSD.

For example, a note may be retrieved from a cash cassette. The note may be transferred to the scale. The note may be weighed. The processor may determine if the weight of the note exceeds the threshold weight for a U.S. Treasury Note. The processor may determine if the weight of the note is less than the threshold weight of a U.S. Treasury Note. The processor may transmit instructions to the scale. The processor may instruct the scale to transfer a note that exceeds the threshold weight of a U.S. Treasury Note to the purge-bin. The processor may instruct the scale to transfer a note that is less than the minimum threshold weight to the purge-bin.

The note may be marked in the purge-bin. The note may be categorized. The purge-bin may categorize the note as an unacceptable note. The SSD may create an account record. The account record may be associated with a transaction identifier. The transaction identifier may be associated with the unacceptable note. The account record may include information about the unacceptable note. The information may include the improper weight of the note.

In response to detection of an unacceptable note, the SSD may retrieve a second note. The second note may be a plurality of notes. The second note may be a replacement note. The second note may be retrieved when the first note is transferred to the purge-bin. For example, the SSD may collect a stack of notes from a cash cassette. The stack of notes may be transferred to the scale. The scale may weigh each of the notes in the stack. The weight of each note may be compared to a threshold weight. The stack may include five notes. The weight of each individual note in the stack of five notes may be compared to the threshold weight of a note. For example, the scale may determine that two of the five notes exceed the maximum threshold weight. The scale may determine that one note does not satisfy the minimum threshold weight requirement. The SSD may transfer the two notes that exceed the maximum threshold weight to the purge-bin. The SSD may transfer the one note that does not satisfy the minimum threshold weight to the purge-bin. The SSD may retrieve three replacement notes. Each note may correspond to one note that was transferred to the purge-bin.

Each of the replacement notes may be weighed. For example, the SSD may retrieve each of the replacement notes from a cash cassette. The SSD may transfer the replacement bills to a scale. The replacement notes may be weighed. The SSD may determine if the weight of the replacement notes is within the proper threshold range of a note.

The SSD may measure a weight of the purge-bin. The weight may be a first weight. The first weight may be the weight of all of the contents of the purge-bin. The purge-bin may include a scale. The scale may be a sensor in the floor of the purge-bin. The scale may weigh the contents of the purge-bin. The first weight may be stored in a database associated with the SSD. The first weight may be designated as the threshold weight. For example, five bills may be dispensed to a customer. The customer may collect three of the bills. The two uncollected bills may be retracted. The SSD may obtain a first weight of the contents of the purge-bin. The SSD may designate the first weight as the threshold weight. The first weight of the contents of the purge-bin may be 120 grams. The SSD may transfer the two retracted uncollected bills to the purge-bin. The SSD may obtain a second weight of the contents of the purge-bin. The second weight of the purge-bin may be 122 grams.

The SSD may calculate the monetary value of the retracted uncollected bills. The monetary value may be calculated based on the weight of the contents in the purge-bin. The SSD may calculate the difference between the first weight of the purge-bin and the second weight of the purge-bin. For example, the SSD may determine the difference between 120 grams and 122 grams. The weight difference may be 2 grams.

The SSD may associate the weight difference with a number of notes. For example, the SSD may associate 2 grams with two notes. Each note may correspond to 1.0 gram. The SSD may associate the number of notes with a monetary value. For example, each note may be associated with a monetary value of $10. The SSD may associate two notes with a monetary value of $20.

The SSD may calculate the weight measurement of a bill. The SSD may store a threshold weight of a single bill of currency. The threshold weight may be stored in a database associated with the SSD. The database may be a non-transitory computer readable medium. The SSD may store a denomination of the single bill in a database associated with the SSD.

The methods may include calculating a monetary value corresponding to a weight. The weight may be a weight of a plurality of bills. The weight may be measured by a scale. The scale may be a component of a SSD. The scale may be integrated into a purge-bin of the SSD. The weight may be a weight of a plurality of bills retracted by a dispenser of the SSD.

The SSD may store a threshold weight of a single bill of currency in a machine readable medium. The threshold weight may be average weight of the single bill. The threshold weight may be a weight of a typical bill of a currency. For example, a threshold weight of a U.S. Treasury note may be one gram. a non-transitory machine readable medium may store a denomination corresponding to the threshold weight.

The value may be calculated based on a quotient of the weight of retracted bills and the threshold weight. The value may be calculated based on a product of the quotient and the denomination stored in the machine readable memory.

A SSD may receive a withdrawal request from a customer for $200 in cash. The SSD may dispense ten twenty dollar-bills in response to the request. After expiration of a time-out period, the SSD may retract a portion of the dispensed ten $20 bills. The SSD may measure a weight of the retracted bills. The SSD may divide the weight by the threshold weight. Dividing the weight by the threshold weight may provide an estimation of a number of bills retracted.

The threshold weight may be determined based on reducing customer dissatisfaction. The threshold weight may be determined based on an assumption that the customer collected a minimum number of the dispensed bills. The threshold weight may correspond to a pre-determined number of bills. For example, the monetary value may be the percentage difference between the second weight and the threshold weight.

The threshold weight may be 0.85 grams. The weight of the retracted bills may be 2 grams. A quotient of the weight and the threshold weight may be 2.35. The SSD may derive a monetary value corresponding to the weight by multiplying the quotient and the denomination of the dispensed bills. The monetary value may be calculated based on a product. The product may be the product of the quotient and the denomination.

The SSD may determine that approximately $47 was retracted. The SSD may be configured to round the monetary value based on a denomination of the dispensed bills. If the SSD dispensed twenty dollar-bills, the SSD may round $47 to $60. If the SSD dispensed ten dollar-bills, the SSD may round $47 to $50.

Based on the monetary value of the retracted bills, the SSD may determine a monetary value of bills collected by the customer. If the SSD dispensed ten twenty dollar-bills and calculated a monetary value of retracted bills corresponding to $47, the SSD may determine that the SSD retracted not more than three twenty dollar-bills or $60. The SSD may determine that the customer collected seven twenty dollar-bills or $140.

The SSD may be configured to round a quotient of the weight and the threshold weight. The SSD may round the quotient to a nearest whole number. For example, if the quotient is 2.35, the SSD may round 2.35 to three. Based on the rounded value, the SSD may determine that three $20 bills were retracted by the SSD. Based on the number of retracted bills, the SSD may determine a number of bills collected by the customer. An estimate of the number of bills collected by the customer may correspond to difference between a number of bills dispensed the customer by the SSD and an approximate number of bills retracted by the SSD. The approximate number of bills retracted by the SSD may be determined based on the quotient of the weight and the threshold weight.

Methods may include associating a monetary value with a transaction identifier. The monetary value may correspond to a weight of currency. The currency may be currency retracted by an SSD. The monetary value may correspond to a weight of any suitable tangible item retracted by an SSD. For example, the tangible item may be a lottery ticket.

The methods may include identifying the transaction identifier. The transaction identifier may correspond to an action performed by the SSD. The transaction identifier may correspond to a retraction of a tangible item by the SSD. The transaction identifier may be identified based on a temporal proximity of an action performed by the SSD and a weighing of a tangible item by the SSD.

For example, an SSD may dispense currency. After expiration of a time-out ("TO") period, the SSD may retract a portion of the dispensed currency. The SSD may weigh the portion of the retracted currency to determine a monetary value of the retracted currency. The SSD may associate the monetary value with one or more actions performed by the SSD within a time corresponding to $T_{threshold}$+TO. Time $T_{threshold}$ may be determined based on identifying a SSD action that occurred during one SSD session. Time $T_{threshold}$ may correspond to an average duration of a SSD session.

Time $T_{threshold}$ may be determined based on identifying a dispensing of currency preceding the retracting. Based on a transaction identifier corresponding to the dispensing, a customer or customer account may be identified. The customer or customer account may be debited or credited based on a difference between an amount of currency dispensed to the customer and a monetary value of the currency retracted by the SSD. The currency retracted by the SSD may be retracted within $T_{threshold}$+TO of the dispensing to the customer.

The SSD may generate an activity record. The activity record may include all suitable information related to a transaction, session or activity. The record may include a weight. For example, a dispenser may dispense a stack of bills to a customer. The dispenser may retract the uncollected bills. The uncollected bills may be transferred to a scale. The scale may weigh the uncollected bills.

The record may include a first date. The first date may be associated with the transaction. The first date may be the date of the transaction occurrence. The first date may be associated with the first weight. The record may include a first time. The first time may be a time associated with the transaction. The first time may be the time of the transaction occurrence. The first time may be associated with the first weight. For example, the first time may be the time the first weight was obtained.

The record may include a monetary value. The monetary value may be a monetary value corresponding to a portion of the currency. The portion of the currency may be the portion of currency retracted by the dispenser. For example, the dispenser may dispense five bills to a customer. The customer may collect three of the bills. After a period of time, the dispenser may retract the two uncollected bills. The two uncollected bills may be transferred to a scale. The scale may obtain the weight of the two uncollected retracted bills. The weight of the two uncollected retracted bills may be assigned a monetary value.

The record may include a transaction identifier. The transaction identifier may correspond to the dispensing of the currency. The transaction identifier may correspond to any transaction details related to the dispensing of the currency.

The record may include a second time. The second time may be associated with the dispensing of the currency. The record may include a second date. The second date may be associated with the dispensing. For example, the SSD may dispense five bills to a customer at 10:00 AM on Jan. 1, 2014. The time and date of the dispensing may be included in the record.

The record may include an amount of funds. The funds may be the amount of funds requested by a customer. For example the record may indicate that the customer requested $100. The record may indicate that $60 was dispensed to the customer. The requested amount of funds may be associated with the transaction identifier. For example, the request to receive funds may be associated with transaction identifier 45239.

The record may include a difference. The difference may be the difference between the requested amount of funds and the monetary value of the funds received by the customer. The difference may be the difference in weight between the money presented to the customer and the money collected by the customer. The difference may be a monetary value. For example, the difference between the $100 requested by the customer and the $60 received by the customer may be $40. The difference may be the number of bills. For example, the SSD may dispense bills with a $20 denomination. The difference between $100 requested by the customer and the $60 received by the customer may be two bills.

The methods may include receiving a claim. The claim may be submitted by a customer. The claim may be submitted using an SSD. The SSD may route the claim to a financial institution. For example, during a session, the customer may initiate a claim. The SSD may be configured to receive claims. During a session, the SSD may offer an option to submit a claim.

The claim may be submitted directly to the financial institution. The customer may initiate contact with the financial institution after completion of a transaction. The contact may be initiated by any suitable means, including telephone, facsimile, e-mail, U.S. Postal Service, SMS or text messaging, and online banking.

The claim may be a mis-dispense claim. For example, the customer may claim that the amount received is less than the amount requested. The customer may claim that the amount received is less than the amount debited to the customer's account. For example, the customer may request $100 from a SSD. The SSD may dispense $60. The customer account may indicate that $100 was dispensed. The customer may submit a claim for $40. The customer may claim that no money was received. For example, the SSD may dispense $100. The customer may collect $60. The SSD may retract $40. The customer account may be debited for $100. The customer may submit a claim that no cash was received. The claim may be a claim for $100.

The SSD may be configured to transmit the activity record. The record may be transmitted to the customer. The record may be transmitted to the financial institution. For example, the record may be sent to an off-site database or server. The record may be transmitted in response to the receiving of the mis-dispense claim.

The methods may include transmitting the activity record to the customer. The activity record may be transmitted to the customer in response to the mis-dispense claim. For example, a customer may request $100 from an SSD. The SSD may dispense $100. The customer may collect $40. The SSD may retract the uncollected $60. The customer's account may be debited for $40. The customer may submit a claim that no cash was collected. In response to the claim, the activity record may be transmitted to the customer. The activity record may include details about the $40 collected by the customer. The activity record may include the difference in weight between the amount of bills dispensed to the customer and the amount of uncollected bills retracted from the customer. The record may include a relationship between the weight of the bills and the monetary value of the bills. The record may include the date and time of the transaction. The record may include additional evidence. For example, the record may include photographic or video evidence of the customer collecting cash from the SSD. The video or photograph may include a time-stamp, session identifier or transaction identifier. The time-stamp, session identifier or transaction identifier may be matched to the transaction identifier or time of the dispensing of the cash.

The methods may include dispensing currency. The currency may be dispensed in multiple denominations. For example, the SSD may dispense $100, $50, $20, $10, $5 and $1 denominations. The methods may include receiving a request for a denomination preference. For example, a customer may input a request for $50 into an SSD. The customer may request the $50 in a denomination of two $20 bills and two $5 bills.

The activity record may indicate the denominations of currency dispensed to the customer. The activity record may indicate the weight of the currency dispensed. The weight of the currency may be assigned a measurement. For example, the SSD may assign a weight of 1.0 grams to a single U.S. Treasury Note. The activity record may include a weight difference. The weight difference may be the difference between the weight of the bills dispensed and the weight of the uncollected bills retracted. The difference between the weight of the bills dispensed to the customer and the weight of the uncollected bills retracted from the customer may be the weight of the bills collected by the customer. For example, the activity record may state that the weight of bills dispensed to a customer is 8.0 grams. The record may state that the weight of uncollected bills retracted by the dispenser is 5.0 grams. The difference in weight may be 3.0 grams. The 3.0 grams may be the weight of the bills collected by the customer.

The activity record may state that the SSD is configured to dispense $20 denomination bills exclusively. The activity record may assign a monetary value of $60 ($20×3.0 grams) to the difference between the bills dispensed to the customer and uncollected bills retracted from the customer. The $60 may be the monetary value of the bills collected by the customer.

The activity record may indicate that multiple denominations are dispensed by the SSD. For example, the activity record may state the $20 and $5 bill denominations are dispensed by the SSD. The activity record may assign the lowest denomination to the difference in weight between the bills dispensed to the customer and the uncollected bills retracted from the customer. The lowest denomination may be the lowest monetary value of the bills dispensed by the SSD. The lowest denomination may be the lowest possible monetary value for the bills collected by the customer. For example, where the difference in weight is 3.0 grams, the SSD may assign a monetary value of $15 to the difference. The $15 may be the monetary value of the bills collected by the customer. The $15 may be the amount debited to the customer's account.

The activity record may assign the highest denomination to uncollected bills retracted by the SSD. For example, an SSD may offer $10 and $5 bill denominations. The SSD may present five bills to a customer. The five bills may have a weight of 5.0 grams. The customer may collect two of the bills. The SSD may retract the uncollected bills. The uncollected bills may have a weight of 3.0 grams. Based on the weight of 3.0 grams, the SSD may determine that three uncollected bills were retracted. The SSD may assign the highest denomination monetary value to the three bills. For example, the highest denomination monetary value of $10 per bill may assign a $30 monetary value to the three uncollected bills retracted by the SSD. The $30 may be credited to the customer's account.

The SSD may include a purge-bin. The purge bin may be a component of a purge-bin system. The purge-bin may be housed within the SSD. The purge-bin may be a stand-alone component connected to the SSD. The purge-bin may be removable from the SSD. The purge-bin system may include a dispenser. The dispenser may be configured to dispense a tangible item. The dispenser may be configured to retract a tangible item. The dispenser may be connected to the purge-bin. The dispenser may be connected to a scale. The dispenser may be connected to a cash cassette.

The purge-bin may be configured to receive the tangible item. The tangible item may be transferred to the purge-bin. A feeder network may transfer the tangible item to the purge-bin. The feeder network may transfer the tangible item to the scale. The feeder network may transfer the tangible item to the purge-bin.

The purge-bin may include storage components. The purge-bin may include one or more receptacles. The receptacle may be configured to store the tangible item. The receptacle may be configured to store two or more tangible items. The purge-bin may include a scale. The scale may be integrated into the floor of the purge-bin. The scale may be a sensor in the floor of the purge-bin. The scale may weigh the tangible item. The scale may weigh the item after it is retracted by the dispenser. The scale may weigh the tangible item in the purge-bin. The scale may weigh the tangible item prior to transferring the item to the purge-bin.

The scale may be calibrated to detect a weight. The weight may be the weight of a bank note. The bank note may be a single bank note. The bank note may be a U.S. Treasury Note. The calibration may include setting the weight of all of the contents of the purge-bin to zero prior to receiving a tangible item. For example, a purge-bin may include contents with a weight of 1.2 kilograms. The SSD dispenser may retract two uncollected bills. The SSD may set the weight of the purge-bin to zero. The dispenser may transfer the two uncollected retracted bills to the purge-bin. The purge-bin may weigh the two uncollected retracted bills.

The scale may be calibrated by storing the weight of the current contents of the purge-bin. The weight may be stored in a database associated with the SSD. For example, the weight of the contents of the purge-bin may be 50 grams. The SSD may store the weight of 50 grams in a database. The SSD may transfer two uncollected retracted bills to the purge-bin. The SSD may weigh the contents of the purge-bin. The total weight may be 52 grams. The SSD may determine the difference between the stored weight measurement of the purge-bin and the current weight of the purge-bin. The weight measurement may be 2.0 grams. The weight measurement of 2.0 grams may be stored in the database. The 2.0 grams may be associated with the two uncollected bills. The weight of 2.0 grams may be saved to the activity record associated with the two uncollected retracted bills.

The SSD may include a purge-bin. The purge-bin may include a receptacle. The receptacle may be configured to store a plurality of tangible items. The receptacle may store a first plurality of tangible items. For example, the receptacle may receive a stack of five bills. The five bills may be the first plurality. The five bills may be stored in the receptacle. The receptacle may include a scale. The scale may measure a weight. The weight may be a baseline weight. The weight may be the weight of the first plurality of tangible items within the receptacle. For example, the scale may measure the weight of the five bills in the receptacle. The five bills may weigh 5.0 grams. 5.0 grams may be set as the baseline weight of the receptacle.

The purge-bin may be configured to receive a second plurality of tangible items. For example, the purge-bin may receive a second stack of bills. The second stack of bills may be the second plurality of tangible items. The second stack of bills may include ten bills. The purge-bin may transfer the first plurality of items to the receptacle. The receptacle may store the second plurality of tangible items. For example, the receptacle may store the ten bills. The scale may measure a weight of the first and second pluralities. The weight may be a cumulative weight of the first and second pluralities. For example, the scale may measure the combined weight of all of the contents of the purge-bin. The scale may measure the weight of the ten bills of the second plurality and the five bills of the first plurality. The cumulative weight may be 15.0 grams.

The SSD may calculate a difference between the cumulative weight of the first and second pluralities and the baseline weight of the first plurality. For example, the baseline weight may be the weight of the first plurality. The first plurality may have a weight of 5.0 grams. The difference between the cumulative weight of 15.0 grams and the baseline weight of 5.0 grams may be 10.0 grams. The difference in weight may be used to calculate a weight measurement of the second plurality of tangible items. For example, the measurement of the second plurality may be 10.0 grams. Each 1.0 gram measurement may correspond to one note. Each note may correspond to $20. The monetary value of the second plurality may be $200.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100. Self-service device 100 may be an ATM. Self-service device 100 may be a kiosk. Self-service device 100 may include monitor 102, keypad 104, card reader port 106, document acceptor 108, item dispenser 110 and security screen 112.

Monitor 102 may exchange visual and or audio information with a customer. Keypad 104 may include alphanumeric keys 114 for the customer to enter numerical and textual data. Keypad 104 may include control keys 116. In some embodiments, control keys 116 may be used to communicate control information, such as instructions, to self-service device 100. Keypad 104 may include soft keys 118. Soft keys 118 may have functions that are dictated by programming and are presented to the customer using information that may be displayed on monitor 102.

Card reader port 106 may be the front end of any suitable card reader. The card reader may read magnetically encoded information on transaction instruments such as bank cards. In some embodiments, self-service device 100 may include a contactless chip reader, a wireless transceiver or any other suitable interface for exchanging transaction information with a transaction instrument. The transaction instrument may be a chip, an RFID tag, a smart card, a tablet, a smartphone or any other suitable device.

In some embodiments, self-service device 100 may include a biometric sensor (not shown). The biometric sensor may identify a customer based on a characteristic, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral characteristic.

Document acceptor 108 may accept any suitable tangible item. For example, document acceptor 108 may accept envelopes, deposit forms, bills, checks or any other suitable documents. In some embodiments, document acceptor 108 may feed into a scanner that digitizes the documents for image-based transaction processing.

Item dispenser 110 may dispense items. For example, item dispenser 110 may dispense bills. Item dispenser 110 may retract bills uncollected by a customer of device 100.

Security screen 112 may visually screen a surveillance device (not shown). The surveillance device may provide video information about individuals that are present near the self-service device and the conditions there. The surveillance device may detect a presence of motion in a vicinity of device 100.

Figure 2:
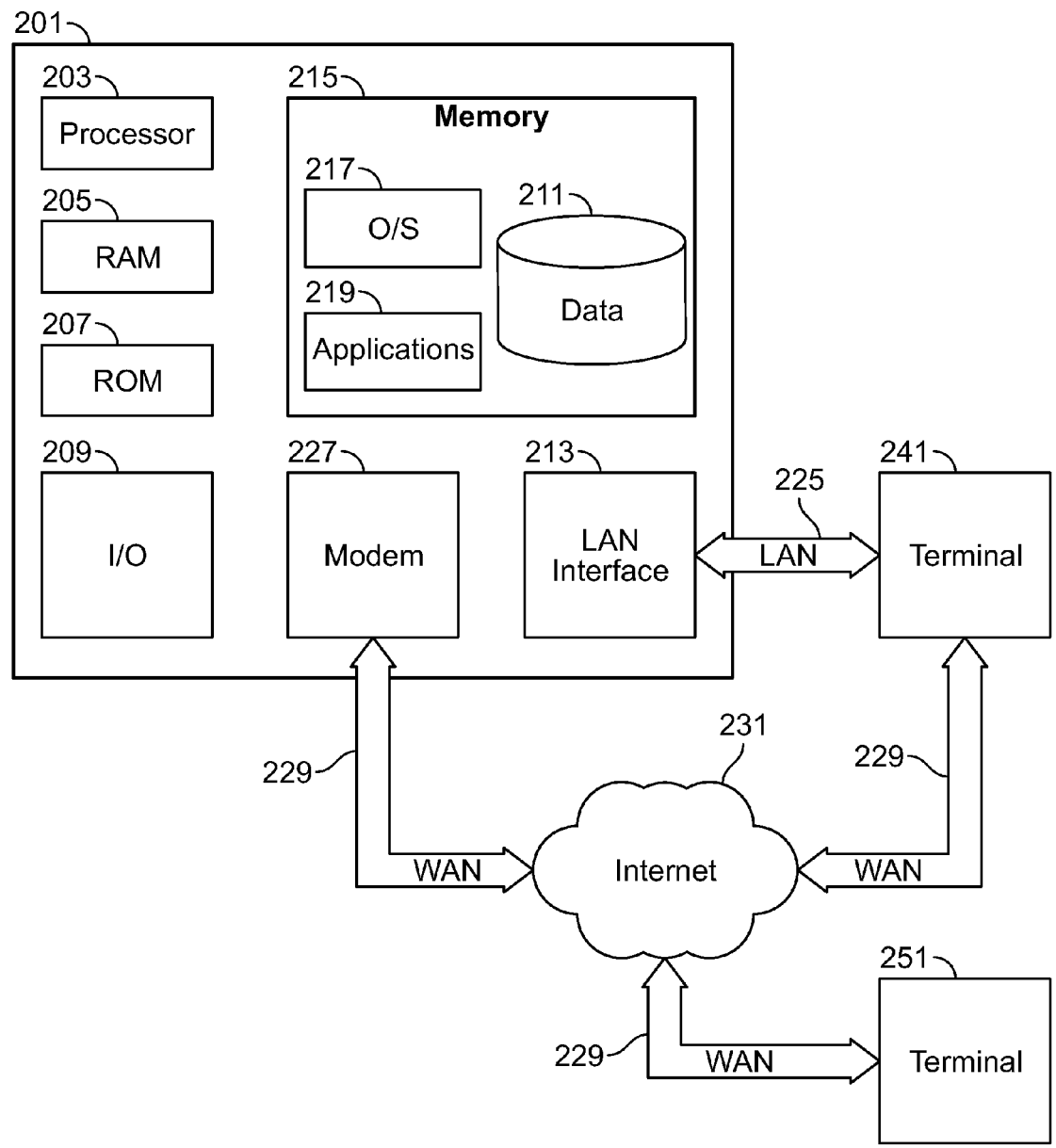
FIG. 2 shows an illustrative apparatus in accordance with principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231.

It will be appreciated that the network connections shown are illustrative and other means of establishing a communication link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, tablet, smartphone or any other suitable device for storing, transmitting and/or transporting relevant information.

Any information described above in connection with database 211, and any other suitable information, may be stored in memory 215.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones, tablets and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
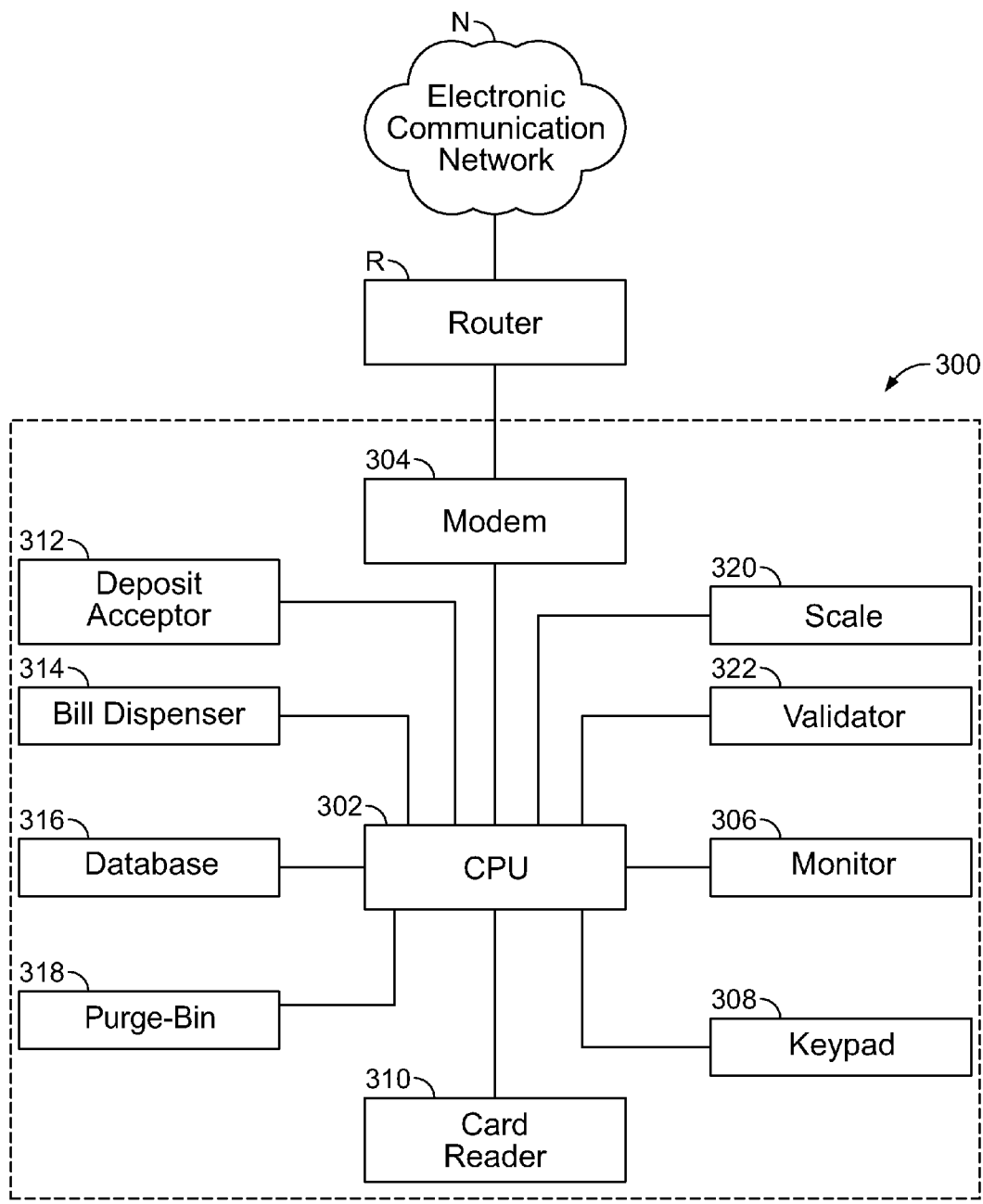
FIG. 3 shows an illustrative apparatus in accordance with principles of the invention.

FIG. 3 shows illustrative apparatus 300. Apparatus 300 may include a control system for controlling a self-service device ("SSD") such as an ATM or device 100 (shown in FIG. 1).

Apparatus 300 may be controlled by CPU 302. CPU 302 may include one or more features of server 201 (shown in FIG. 2). CPU 302 may exchange transaction information with electronic communication network N, via modem 304, which is in communication with router R.

CPU 302 may receive transaction information from a customer via monitor 306, keypad 308, card reader 310, deposit acceptor 312, bill dispenser 314 or database 316.

CPU 302 may direct the SSD to dispense bills through bill dispenser 314. CPU 302 may transmit information to bill dispenser 314. The information may direct bill dispenser 314 to retract any currency remaining in bill dispenser 314 after expiration of a time-out period.

CPU 302 may receive information from purge-bin 318. Information received by CPU 302 from purge-bin 318 may be transmitted to database 316. For example, purge-bin 318 may transmit the weight of a currency note to CPU 302. CPU 302 may transmit that information to database 316. Information received by CPU 302 from purge-bin 318 may be transmitted on Electronic Communication Network N using Router R.

CPU 302 may transmit information to purge-bin 318. For example, CPU 302 may transmit instructions to purge-bin 318 to weigh the notes in the purge-bin.

CPU 302 may instruct scale 320 to transfer bills to purge-bin 318. CPU 302 may instruct purge-bin 318 to store the bills.

CPU 302 may instruct scale 320 to transfer bills to validator 322. Validator 322 may determine whether the bills are acceptable notes. Validator 322 may transmit information to CPU 302. CPU 302 may instruct validator 322 to transfer the bills to purge-bin 318. Purge-bin 318 may separate the bills.

Purge-bin 318 may include scale 320. Scale 320 may be separate from purge-bin 318. Purge-bin 318 may receive the tangible item retracted by bill dispenser 314. Purge-bin 318 may weigh the tangible item in the purge-bin. Purge-bin 318 may transmit the tangible item to scale 320 for weighing. Scale 320 may then weigh the tangible item. Purge-bin 318 may hold one or more tangible items. Purge-bin 318 may be configured to separate the one or more tangible items.

For example, purge-bin 318 may place bank notes from a first transaction into a first location within purge-bin 318. In a further example, purge-bin 318 may place bank notes from a second transaction into a second location within purge-bin 318.

Scale 320 may measure the weight of the tangible item after being retracted by the dispenser. Scale 320 may measure the weight of the tangible item prior to the transfer of the tangible item to the purge-bin. Scale 320 may measure the weight of the tangible item once the item is in the purge-bin.

Scale 320 may be calibrated. Scale 320 may be calibrated to measure the weight of a bank note.

CPU 302 may receive the weight of the tangible item from scale 320. CPU 302 may determine a threshold weight. CPU 302 may be programmed with a threshold weight. The threshold weight may be transmitted to CPU 302 from database 316. If the weight is less than or greater than the threshold weight, scale 320 may transfer the tangible item to purge-bin 318.

Scale 320 may transfer the tangible item to validator 322. Validator 322 may determine whether the tangible item is a bank note. Validator 322 may determine whether the bank note is an acceptable bank note.

Validator 322 may determine the number of tangible items. Validator 322 may determine the number of bank notes. Validator 322 may determine the denomination of the bank note.

Validator 322 may scan the tangible item. Validator 322 may read the tangible item for the presence of any visible or invisible markings. These markings may include, but are not limited to, ultraviolet markings, infrared markings, pen markings, and dirt.

CPU 302 may determine a threshold level of use for a tangible item. CPU 302 may receive the threshold level from database 316. The threshold level of use may include assigning a durability ranking for the tangible item. The threshold level of use may include assigning a ranking for the tangible item based on the cleanliness of the tangible item. The cleanliness may include whether the tangible item is soiled or stained.

Once the tangible item is scanned by validator 322, validator 322 may transmit the information to CPU 302. CPU 302 may instruct validator 322 to transfer the tangible item to purge-bin 318.

Scale 320 may measure a first weight of a group of tangible items. The first weight may be measured prior to the dispensing of the tangible items. Scale 320 may transmit the weight of the group to CPU 302. Scale 320 may measure a second weight of the group of tangible items. The second weight may be measured after the retraction of the tangible items by the dispenser. Scale 320 may transmit the weight of the group to CPU 302.

CPU 302 may determine the difference between the first weight and the second weight. CPU 302 may assign a monetary value to difference between the first weight and the second weight.

Monitor 306 may display any suitable information. Information displayed on monitor 306 may include information received from scale 320, validator 322, purge-bin 318, database 316, bill dispenser 314, deposit acceptor 312 and card reader 310. Monitor 306 may receive information via CPU 302 using one or all of modem 304, router R and electronic communication network N. Monitor 306 may display information input on keyboard 308.

Figure 4A:
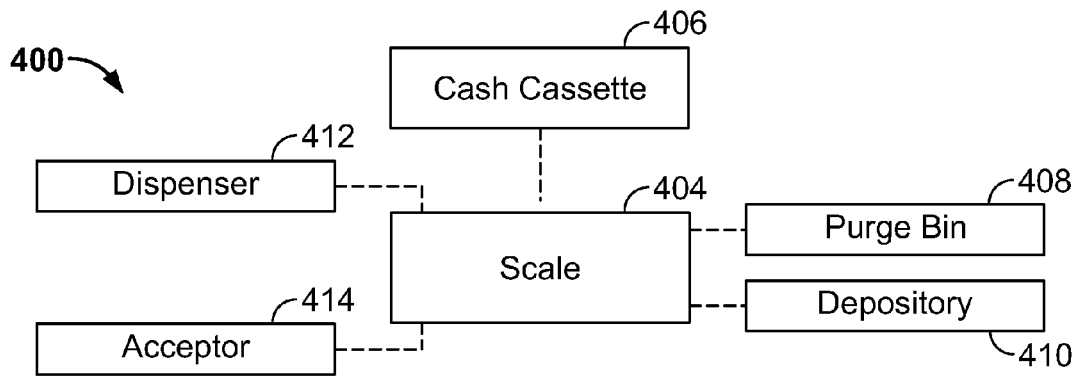
FIG. 4A shows an illustrative apparatus in accordance with principles of the invention.

FIG. 4A shows illustrative apparatus 400. Apparatus 400 may include some or all of the features of apparatus 300. Apparatus 400 may include a control system for controlling a SSD such as an ATM or device 100 (shown in FIG. 1A).

Apparatus 400 may include scale 404. Scale 404 may weigh one or more tangible items. Scale 404 may receive the tangible items from cash cassette 406. Cash cassette 406 may include notes that are loaded into the SSD. Cash cassette 406 may be restocked. Cash cassette 406 may be removable from the SSD. Cash cassette 406 may be accessed when a withdrawal is initiated. Cash cassette 406 may be connected to scale 404. Cash cassette 406 may be connected to scale 404 via the feeder network. For example, when a customer initiates a cash withdrawal, cash cassette 406 may transfer the cash to scale 404. Scale 404 may weigh the cash prior to transferring the bills to dispenser 412.

Cash cassette 406 may receive notes from scale 404. Scale 404 may transmit deposited notes to cash cassette 406. Scale 404 may transmit notes that have been unsuccessfully disbursed back to cash cassette 406.

Scale 404 may transmit tangible items to purge-bin 408. Purge-bin 408 may receive notes that were attempted for disbursement by dispenser 412. Purge-bin 408 may receive one or more notes that were retracted by dispenser 412. Purge-bin 408 may transmit the notes to depository 410. Purge-bin 408 may retain the notes until the SSD is replenished.

Scale 404 may transmit tangible items to depository 410. Depository 410 may receive notes from scale 404 that were submitted using acceptor 414.

Figure 4B:
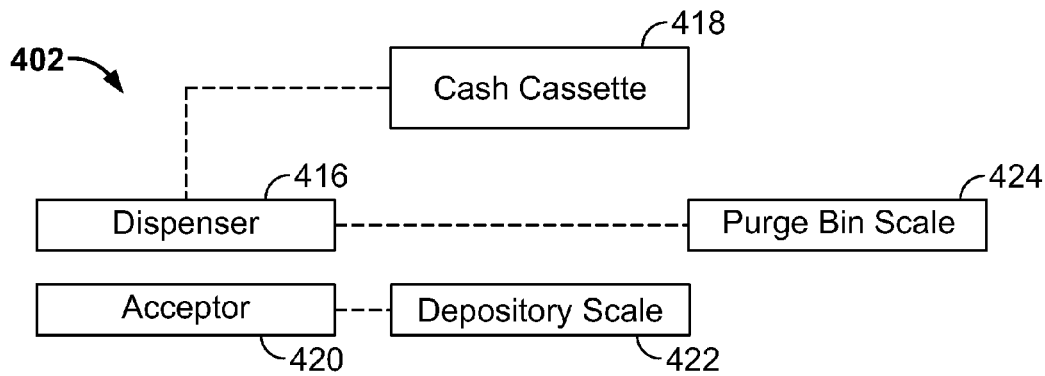
FIG. 4B shows an illustrative apparatus in accordance with principles of the invention.

FIG. 4B shows illustrative apparatus 402. Apparatus 402 may include some or all of the features of apparatus 300 and apparatus 400.

Apparatus 402 may include dispenser 416. Dispenser 416 may receive one or more tangible items. The tangible items may be received from cash cassette 418.

Cash cassette 418 may be a preloaded cassette of bank notes. Cash cassette 418 may transmit the notes to dispenser 416. A portion of the bank notes may be unsuccessfully disbursed to the customer. In the event of an unsuccessful disbursement, dispenser 416 may retract the undisbursed bank notes. Dispenser 416 may transmit the undisbursed bank notes to purge-bin scale 424.

Apparatus 402 may include acceptor 420. Acceptor 420 may receive one or more tangible items from a customer. The tangible item may be a bank note. Acceptor 420 may transmit the tangible item to depository scale 422.

Figure 5:
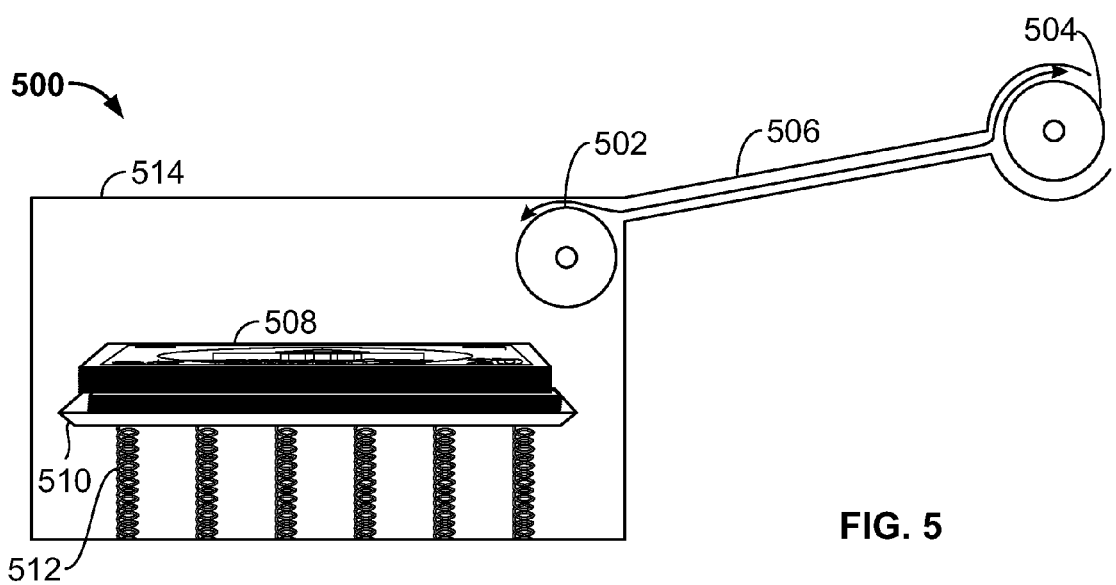
FIG. 5 shows an illustrative apparatus in accordance with principles of the invention.

FIG. 5 shows illustrative apparatus 500. Apparatus 500 may include some or all of the features of apparatus 300, apparatus 400 and apparatus 402. Apparatus 500 may include rollers 502 and 504. Rollers 502 and 504 may be connected by feeder network 506. Rollers 502 and 504 may be included in feeder network 506.

Feeder network 506 may be a bridge. Feeder network 506 may be a moving feeder network. Feeder network 506 may be stationary. Feeder network 506 may allow for the movement of cash stack 508 from roller 502 to roller 504. Roller 502 may be spatially lower down than roller 504 to allow gravity to transport cash stack 508. Cash stack 508 may rest on scale 510. Scale 510 may be any suitable scale. Scale 510 may be calibrated to detect minute changes in weight. Scale 510 may include springs 512.

Figure 6:
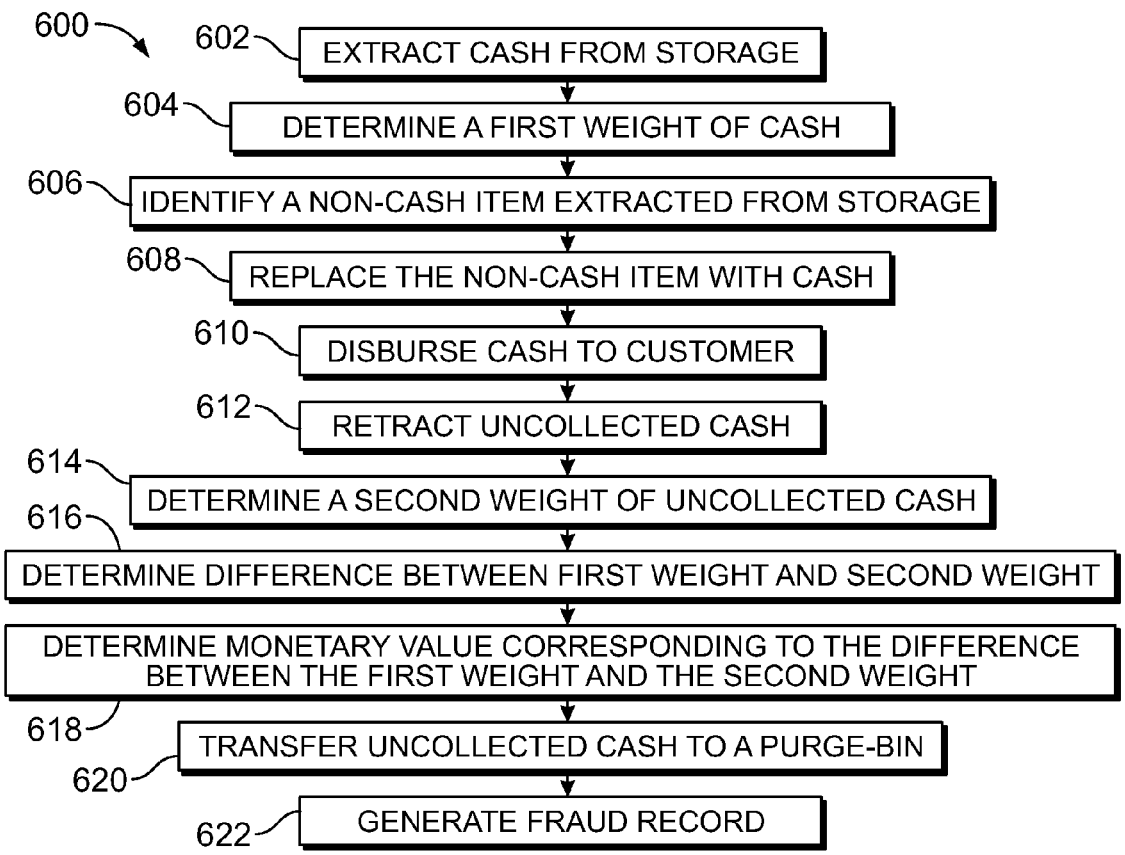
FIG. 6 shows an illustrative process in accordance with principles of the invention.
Figure 7:
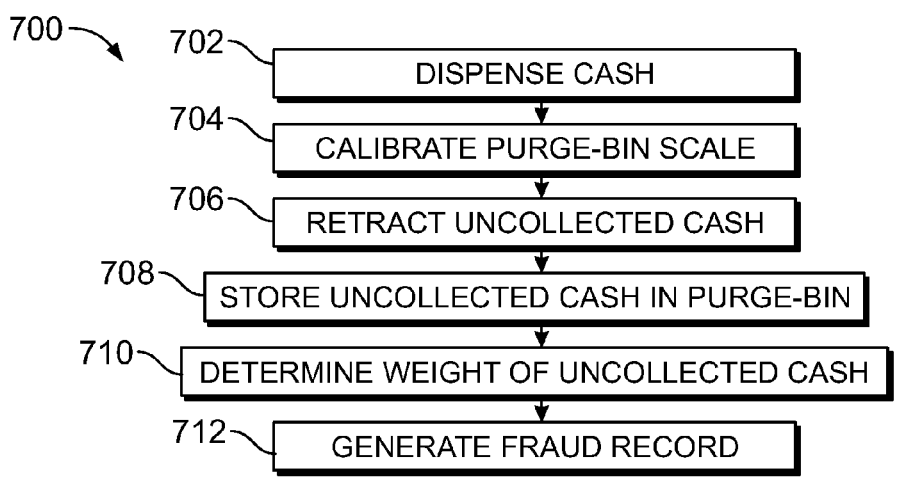
FIG. 7 shows illustrative process in accordance with principles of the invention.

Processes in accordance with the principles of the invention may include one or more features of the processes illustrated in FIGS. 6-7. For the sake of illustration, the steps of the processes illustrated in FIG. 6-7 will be described as being performed by a "system." The "system" may include one or more of the features of the apparatus that are shown in FIGS. and/or 3 and/or any other suitable device or approach. The "system" may be provided by an entity. The entity may be an individual, an organization or any other suitable entity.

Illustrative information that is exchanged with the system may be transmitted and displayed using any suitable mark-up language under any suitable protocol, such as those based on JAVA, COCOA, XML or any other suitable and languages or protocols.

FIG. 6 shows illustrative process 600. One or more steps of the process may be executed using an ATM, SSD or any other suitable device.

Process 600 may begin at step 602. At step 602, the system may extract cash from storage. Storage may be any suitable storage for cash, including, but not limited to a cash cassette or depository.

At step 604, the system may determine a first weight of the cash extracted from storage. The weight may be determined using a scale. The weight may be determined by counting the number of notes and assigning a predetermined monetary value based on the weight of each note. The notes may be counted using a note counter.

At step 606, the system may identify a non-cash item extracted from storage. The system may identify the item as a non-cash item using any suitable means. For example, the validator 322 of apparatus 300 (FIG. 3) may determine that a non-cash item is extracted from storage. This determination may be made using any suitable identification process, such as weight determination, optical scan, ultraviolet or infrared scan, or any other suitable method.

At step 608, the system may replace the non-cash item from step 606 with cash. The non-cash item may be sent to the purge-bin. The non-cash item may be inspected. The non-cash item may be coupled with an identifier. The non-cash item may be stored with the identifier. The identifier may be cross referenced to an account record or activity record. The replacement cash may be extracted from storage. The replacement cash may be extracted from a specialized replacement cash compartment. The system may note the amount of replacement cash that is extracted.

At step 610, the system may disburse cash to the customer. The system may generate a record. The record may contain the amount of cash disbursed, a customer identification method or number, and the time of the transaction. The record may be cross referenced to an identifier. The identifier may be the identifier coupled to the non-cash item. The system may link the record to video recording of the transaction. The video recording may include information from a camera. The camera may be linked to the SSD. The camera may capture information and/or footage about the customer. The camera may record an image of the customer. The camera may record the customer's interactions with the SSD. For example, the camera may record the customer taking the disbursed cash.

At step 612, the system may retract uncollected cash. The uncollected cash may be transmitted to the purge-bin. The uncollected cash may be transmitted to the depository. The uncollected cash may be placed in a compartment. The compartment may be tagged with any suitable information related to the transaction. The uncollected cash may be tagged.

At step 614, the system may determine a second weight of the uncollected cash. The second weight may be calculated using a scale. The scale may be located in the purge-bin. The scale may be distinct from the purge-bin.

At step 616, the system may determine the difference between the first weight and the second weight. At step 618, the system may determine the monetary value corresponding to the difference between the first weight and the second weight. The monetary value may be determined based on a predetermined weight-to-cash equivalence. For example, each 1.0 gram of weight may correspond to a one bill. In a further example, the SSD may only dispense $20 bills. For each weigh of 1.0 gram, where 1.0 gram corresponds to one bill, 1.0 gram may equate to $20.

At step 620, the system may transfer the uncollected cash to the purge-bin. Each uncollected cash transaction may be stored in a unique unit in the purge-bin. All uncollected cash may be stored together in the purge-bin. Each uncollected cash transaction may be coupled with an identifier. Each uncollected cash transaction may be coupled with an activity record.

At step 622, the system may generate a fraud record. The fraud record may include information related to the transaction. The fraud record may include the difference between the first weight and the second weight. The fraud record may include the monetary value of the difference between the first weight and the second weight. The fraud record may include any other suitable transaction information.

The fraud record may be a physical record. The physical record may be stored with the uncollected cash in the purge-bin. The fraud record may be an electronic record.

FIG. 7 shows illustrative process 700.

At step 702, the system may dispense cash. At step 704, the system may calibrate the purge-bin scale. The scale may be calibrated before each transaction.

At step 706, the system may retract uncollected cash. At step 708, the system may store the uncollected cash in the purge-bin.

At step 710, the system may determine the weight of the uncollected cash.

At step 712, the system may generate a fraud record.

Figure 8:
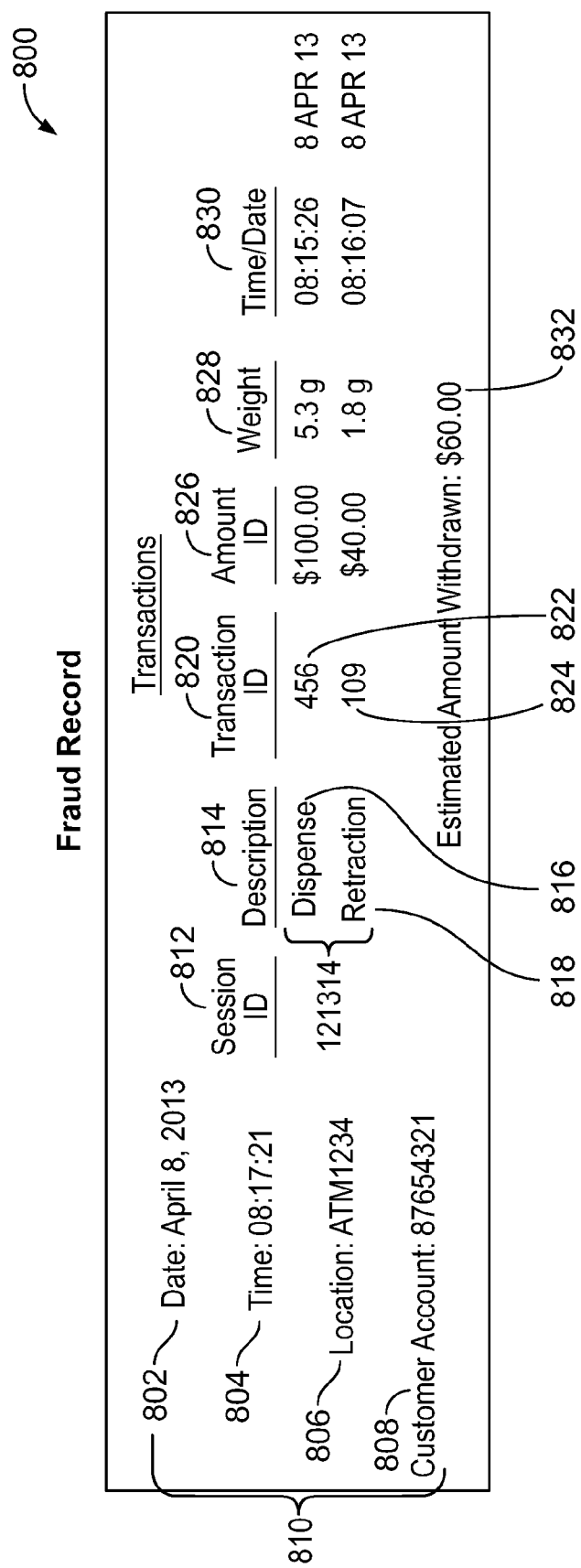
FIG. 8 shows illustrative information in accordance with principles of the invention.

FIG. 8 shows illustrative fraud record 800.

Fraud record 800 may include identifiers 810. Identifiers 810 may include date 802, time 804, location 806 and customer account 808. Identifiers 810 may include information regarding the date, time and location of the transaction. Identifiers 810 may include information regarding the specific account of the transaction.

Fraud record 800 may include session ID 812. Session ID 812 may be a unique session identifier. Session ID 812 may be an identifier unique to the SSD. Session ID 812 may be an identifier unique to the customer. Session ID 812 may be an identifier unique to the specific customer account.

Description 814 may describe the activity type of the one or more transactions performed during session ID 812. For example, description 814 may state that dispense 816 was performed. In a further example, description 814 may state that retraction 818 was performed.

Within session ID 812, each of dispense 816 and retraction 818 may include a unique transaction ID 820. For example, dispense 816 may correspond to transaction ID 822, while retraction 818 may correspond to transaction ID 824.

Further details of each of transaction in session ID 812 may include amount ID 826, weight 828 and time/date 830.

Amount ID 826 may correspond to each unique transaction ID 820. For example, an amount may be provided for dispense 816, and a separate amount may be provided for retraction 818.

Weight 828 may correspond to the weight of the cash for each of dispense 816 and retraction 818. Time/date 830 may correspond to each of the date and time of dispense 816 and retraction 818.

Thus, systems and methods for a self-service device purge-bin scale are therefore provided. Persons skilled in the art will appreciate that the present invention can be practiced by other than the described embodiments, which are presented for purposes of illustration rather than of limitation, and that the present invention is limited only by the claims that follow.

What is claimed is:

1. A self-service device comprising:
   a dispenser configured to:
      disburse one or more tangible items to a customer; and
      retract at least one of the tangible items;
   a purge bin, the purge bin configured to hold the at least one of the tangible items after being retracted by the dispenser;
   a scale configured to measure:
      a first total weight of the one or more tangible items disbursed by the dispenser; and
      a second total weight of the at least one of the tangible items:
         after being retracted by the dispenser; and
         prior to a transfer of the at least one of the tangible items to the purge-bin; and
   a processor configured to determine:
      a difference between the first total weight and the second total weight; and
      a value corresponding to the difference.

2. The device of claim 1 wherein:
   the scale is calibrated to measure a weight of a single tangible item; and
   the single tangible item is:
      a bank note;
      an event ticket;
      a transportation ticket; or
      a receipt.

3. The device of claim 1 wherein the at least one tangible item is a U.S. Treasury Note.

4. The device of claim 1 further comprising a processor configured to determine if the weight is within a threshold weight associated with a U.S. Treasury Note.

5. A method for detecting fraud at a self-service device ("SSD"), the method comprising:
   dispensing currency from the SSD;
   after expiration of a time-out ("TO") following the dispensing, retracting at least a portion of the currency;
   determining a weight of the at least a portion of the currency after the retracting;
   based on the weight, calculating a value corresponding to the at least a portion of the currency; and
   when the determining of the weight occurs within a time corresponding to: $T_{threshold}$+TO, associating the value with a transaction identifier corresponding to the dispensing.

6. The method of claim 5 wherein, when the weight is a first weight, the method further comprises determining a second weight of the currency before the dispensing.

7. The method of claim 6 wherein, when the currency comprises a first U.S. Treasury Note, the method further comprises:
   comparing the second weight to a threshold weight of a U.S. Treasury Note;
   if the second weight is greater than or less than the threshold weight, transferring the first U.S. Treasury Note to a purge-bin;
   retrieving a second U.S. Treasury Note from a storage-bin; and
   determining the second weight of the second U.S. Treasury Note.

8. The method of claim 5:
   further comprising storing the at least a portion of the currency in a purge-bin; and
   the determining comprising:
      prior to the storing, measuring a first weight of all contents of the purge-bin;
      after the storing, measuring a second weight of all contents of the purge-bin; and
      calculating the value based on a difference between:
         the first weight; and
         the second weight.

9. The method of claim 5, the calculating the value comprising:
   storing in a non-transitory machine readable medium:
      a threshold weight of a single bill of currency; and
      a denomination of the single bill; and
   calculating the value based on:
      a quotient of the weight and the threshold weight; and
      a product of the quotient and the denomination.

10. The method of claim 9 wherein:
    the currency consists of one or more U.S. Treasury Notes; and
    the threshold weight of each U.S. Treasury Note is one gram (1 gr.).

11. The method of claim 5 further comprising generating a fraud record, the fraud record comprising:
    the weight;
    a first date and time associated with the weight;
    the value corresponding to the at least a portion of the currency;
    the transaction identifier corresponding to the dispensing;
    a second time and date associated with the dispensing;
    a requested amount of funds associated with the transaction identifier; and
    a difference between the requested amount of funds and the value.

12. The method of claim 11 further comprising:
    receiving a mis-dispense claim from a customer; and
    in response to receiving the mis-dispense claim, transmitting the fraud record to a recipient of the mis-dispense claim.

13. The method of claim 11, wherein, when the SSD is configured to dispense currency comprising a plurality of denominations, the fraud record indicates that the amount corresponds to a minimum amount of currency withdrawn by a customer from the SSD.

14. A purge-bin system comprising:
    a dispenser configured to:
       dispense a tangible item; and
       retract the tangible item; and
    a purge-bin configured to receive the tangible item after the tangible item is retracted by the dispenser, the purge-bin comprising:
       a receptacle configured to store the tangible item retracted by the dispenser; and
       a scale configured to weigh the tangible item after being retracted by the dispenser.

15. The system of claim 14 wherein the scale is calibrated to detect a weight of a single bank note.

16. The system of claim 15 wherein the bank note is a U.S. Treasury Note.

17. The system of claim 14 wherein the scale is integrated into a floor of the purge-bin.

18. The system of claim 14 wherein:
the purge-bin is housed within a self-service device; and
the purge-bin is removable from the self-service device.

19. The system of claim 14 wherein, when the tangible item is one of a first plurality of tangible items:
the receptacle is configured to store a second plurality of tangible items;
the scale is configured measure a baseline weight of the second plurality of tangible items in the receptacle;
the purge-bin is configured to receive the first plurality of tangible items;
the receptacle is configured to store the first plurality of tangible items; and
the scale is configured to:
measure a cumulative weight of the first and second pluralities;
calculate a difference between the cumulative weight and the baseline weight; and
based on the difference, calculate a value of the first plurality of tangible items.

* * * * *